United States Patent [19]

White et al.

[11] 4,373,588

[45] Feb. 15, 1983

[54] FIRE EXTINGUISHING APPARATUS

[75] Inventors: Kenneth T. White, Chicago Heights; Harold F. Roberts, Hawthorn Woods, both of Ill.

[73] Assignee: Chemetron Corporation, Chicago, Ill.

[21] Appl. No.: 200,628

[22] Filed: Oct. 27, 1980

[51] Int. Cl.³ .......................................... A62C 37/06
[52] U.S. Cl. ..................................... 169/19; 169/26; 137/114; 251/63.4
[58] Field of Search .................... 169/9, 11, 5, 19, 20, 169/26, 65, 62, 59, 30; 137/111, 114, 87; 251/63.4, 63.5

[56] References Cited

U.S. PATENT DOCUMENTS

| 843,391 | 2/1907 | Ferris . | |
|---|---|---|---|
| 981,313 | 1/1911 | Robinson . | |
| 1,006,548 | 10/1911 | Hamilton | 169/23 |
| 2,663,153 | 12/1953 | Grant, Jr. | 137/114 |
| 2,783,020 | 2/1957 | Kleczek | 251/63.4 |
| 2,811,958 | 11/1957 | Roush, Jr. | 123/46 |
| 2,865,592 | 12/1958 | Schrank | 251/25 |
| 3,463,236 | 8/1969 | Flajole et al. | 169/9 |
| 4,023,164 | 5/1977 | Delaney | 169/23 |
| 4,136,851 | 1/1979 | Hansen et al. | 251/63 |

Primary Examiner—F. J. Bartuska
Assistant Examiner—Kenneth Noland
Attorney, Agent, or Firm—John K. Williamson; John L. LaPierre

[57] ABSTRACT

An apparatus for pneumatically actuating slave devices in direct response to the discharge of a dry chemical fire extinguishant is disclosed comprising at least one main fire extinguisher from which pressurized dry chemical fire extinguishant passes into a main discharge pipe, and a cartridge containing a pressurized gas connected to the main discharge pipe through an actuator valve. The actuator valve includes a resilient check closing the valve due to the pressurized gas in the cartridge and a piston having a head fit into the actuator valve at sufficiently close tolerance to minimize gas transfer therethrough. The piston head is disposed toward the main discharge pipe and an integrally connected base portion faces the tip of the check and is disposed such that depression of the piston head into the actuator valve moves the check, opening the valve and releasing the contents of the cartridge into a secondary discharge pipe. Pneumatically responsive slave devices are connected to the secondary discharge pipe.

5 Claims, 3 Drawing Figures

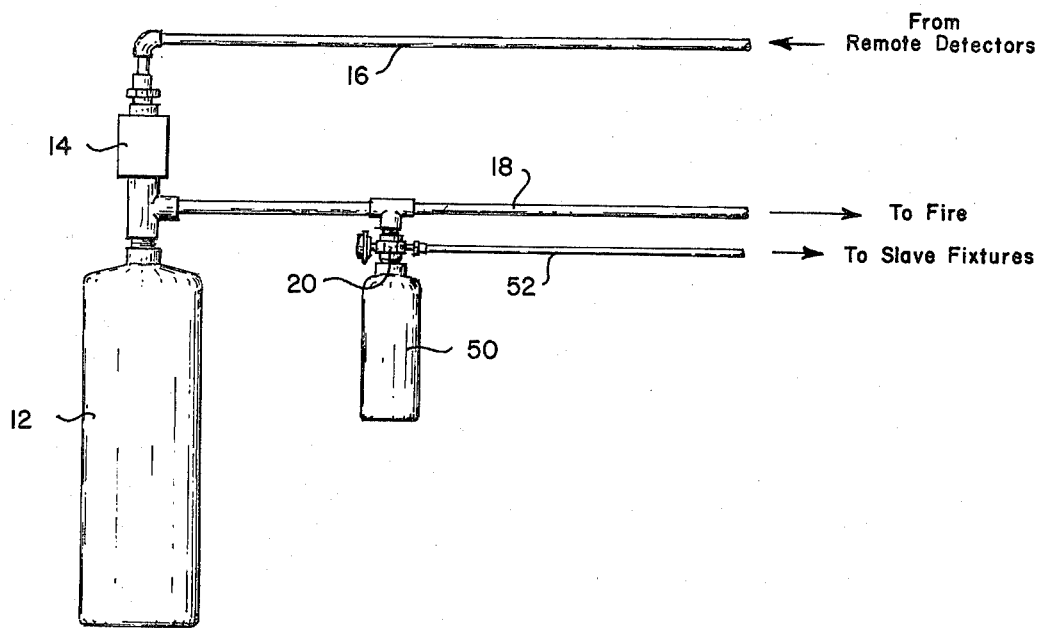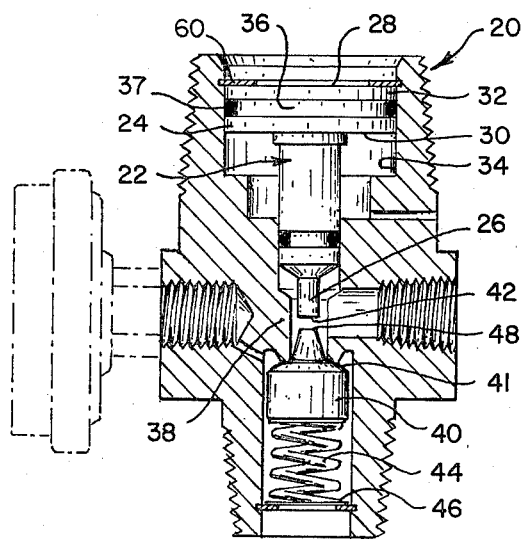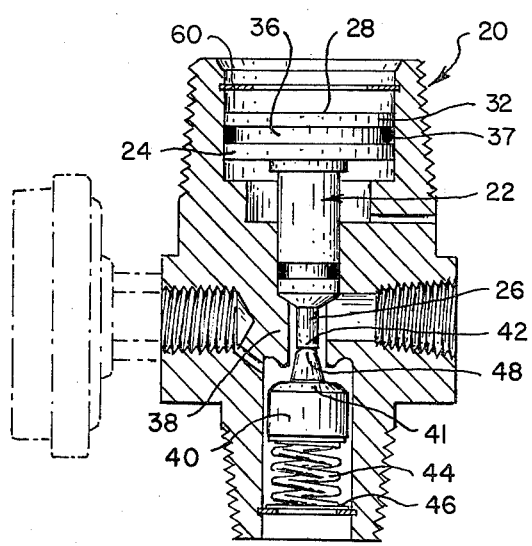

FIRE EXTINGUISHING APPARATUS

SUMMARY OF THE INVENTION

The present invention pertains to fire extinguishing equipment and systems. More particularly, this invention relates to an apparatus for pneumatically actuating slave devices in direct response to the discharge of a dry chemical fire extinguishant.

A typical fire suppression system, such as that employed in restaurants, consists of a pressurized cylinder of dry chemical fire extinguishant mounted near possible fire and flame locations, such as the cooking areas and surfaces. Such fire extinguisher is provided with a discharge line through which the dry chemical extinguishant is delivered to such fire and flame locations when the extinguisher is actuated.

Dry chemical extinguishants are used in such systems because of their effectiveness in suppressing and extinguishing fires of various classes.

Such fire suppression systems include detectors of some kind in the area which are utilized to trigger the fire extinguishant in response to flame, light or heat. After the fire extinguisher is actuated, it is also desirable to actuate a number of additional devices. For example, such fire suppression systems should include an alarm of some type to alert others to the fact that a fire situation exists. Also, such fire suppression systems should include devices such as valves, dampers or doors which can be moved, closed or opened as desired to isolate a fire situation, or cut-off the fuel for the fire, or the like. Furthermore, the fire suppression system may include additional fire extinguishers as devices to provide fire extinguishant at locations adjacent the primary fire situation. Another example would include a device for shutting off the gas or electric power to the fire area, such as the cooking surfaces of a restaurant or drying rack in a painting or dipping operations.

In fire suppression systems wherein the extinguishant is 100% gas, such as carbon dioxide, the gaseous extinguishant could be employed to drive or activate such devices by diverting a portion of such gas directly to pneumatically operated switches or the like. However, the solid particles of agent in dry chemical fire supression systems cause adherence and clogging of the feed lines and the slave devices, as well as other related problems which, to date, have precluded the use of a gas moved dry chemical fire extinguishant to activate downstream slave devices in fire supression systems.

Since the dry chemical extinguishant has not been used to activate such slave devices alternative activators have been employed. For example, such devices have been activated manually. Understandably, however, manual operation of such devices is often delayed and if no personnel are in the area during a fire situation, they may not be activated at all. Another method presently used to activate such devices is to use an electrical system or a mechanical system which is designed to respond directly to the mechanism which triggers the fire extinguisher itself. Since the slave devices are located at a location which may be a significant distance from the main fire extinguisher, typically up to 200 feet, such electrical or mechanical systems must be operable over such distance without failure. Also, the slave devices are typically located at or near the fire itself and, the heat of such fires may adversely affect such systems, such as melting wire insulation resulting in a short circuit, or causing contraction of compression springs or trip switches, or the like, preventing proper activation of such slave devices. Furthermore, there is no simple method of periodically checking such alternative mechanical and electrical slave device activating systems which is highly desirable for fire suppression systems.

Various valves are disclosed in the prior art including U.S. Pat. Nos. 843,391, 981,313, 2,783,020, 2,811,958, 2,865,592 and 4,136,851, but no actuator valves appear known for fire suppression systems which are able to respond directly to the release of a dry chemical fire extinguishant and thereby release a second pneumatic source to drive downstream slave devices.

Accordingly, an apparatus is desired that will pneumatically activate slave devices in direct response to the discharge of a dry chemical fire extinguishant thereby eliminating alternative slave device actuating systems.

The present invention may be summarized as providing an apparatus for pneumatically activating slave devices in direct response to the discharge of a dry chemical fire extinguishant comprising at least one main fire extinguisher from which pressurized dry chemical fire extinguishant passes into a main discharge pipe, and a cartridge containing a pressurized gas connected to the main discharge pipe through an actuator valve. The actuator valve includes a resilient check closing the valve due to the pressurized gas in the cartridge and a piston having a head fit into the actuator valve at sufficiently close tolerance to minimize gas transfer therethrough. The piston head is disposed toward the main discharge pipe and an integrally connected base portion faces the tip of the check and is disposed such than depression of the piston head into the actuator valve moves the check, opening the valve and releasing the contents of the cartridge into a secondary discharge pipe. Pneumatically responsive slave devices are connected to the secondary discharge pipe.

Among the advantages of the present invention is the provision of an apparatus that pneumatically activates slave devices in a dry chemical fire suppression system in direct response to the discharge of the dry chemical fire extinguishant.

An objective of this invention is to provide an apparatus which can respond directly to the release of a dry chemical fire extinguishant without experiencing any adverse affects due to the solid particles of the agent in such dry chemical extinguishant.

A further advantage of this invention is that a secondary source of pressurized gas may be released to activate downstream slave devices in a dry chemical fire suppression system in direct response to the release of the dry chemical extinguishant by providing an appropriate actuator valve therebetween.

Another objective of this invention is to eliminate slave device actuators for dry chemical extinguishing systems which do not operate in direct response to the discharge of the dry chemical extinguishant, and thereby provide a more reliable actuator.

These and other objectives and advantages of this invention will be more fully understood and appreciated with reference to the following detailed description and the accompanying drawings.

BRIEF DESCRIPTION OF THE DRAWINGS

FIG. 1 is a schematic view of a fire suppression system of the present invention.

FIG. 2 is a cross-sectional view of an actuator valve, illustrated schematically in FIG. 1, in the closed position.

FIG. 3 is a cross-sectional view of the actuator valve of FIG. 2 shown in the open position.

DETAILED DESCRIPTION

Referring particularly to the drawings, FIG. 1 schematically illustrates a dry chemical fire suppression system of the present invention. Such dry chemical fire suppression systems are typically employed in restaurants, gas stations, spraying and drying booths for volatile sprays and other commercial and industrial locations. As shown in FIG. 1 this application includes at least one main fire extinguisher 12. Such extinguisher contains a dry chemical fire extinguishant such as sodium bicarbonate, monoammonium phosphate, or potassium bicarbonate. It should be understood that the term dry chemical fire extinguishant includes any fluid mixture which has an extinguishing or suppressing effect on a fire and contains a portion of solid particles suspended therein. Such extinguishers may be of any size, with 10, 12, 15 and 30 pound dry chemical cylinders being typical. Such cylinders are usually constructed of metallic casings, are filled with the dry chemical extinguishant and are prepressurized, for example, on the order 350 psig at 70° F. with dry air or nitrogen gas. A gage is usually provided on such fire extinguisher to provide a ready visual indication that the required gage pressure is present maintaining such extinguisher in operable condition. The pressurized cylinder or extinguisher 12 is fixidly mounted at a location near, yet somewhat remote from possible locations of a fire situation.

The main fire extinguisher 12 must be able to release its contents upon proper activation. Typically, a valve is provided in a control head 14 on the fire extinguisher 12 which remains closed until actuated. In existing fire suppression systems a spring loaded chain or cable extends from the control head 14 through appropriate conduit or piping 16 to possible locations where fire situations may occur and be detected. In the situation of a restaurant, such chain or cable might extend to the hood area or duct area directly above a cooking surface where a fire is most likely to occur.

At or near the possible fire situation location a remote detector such as a fusible link may be provided in the spring loaded chain or cable. Such fusible link consists of a link of eutectic material, which melts at a given or desired heat level. Attaining such heat level should be an accurate indication of a fire situation. When such heat level is attained, the eutectic link melts, freeing the tense cable, thereby releasing the spring tension on the valve causing the fire extinguisher 12 to discharge its dry chemical contents through the main discharge line 18. It should be appreciated that the spring loaded chain or cable described herein is only one example of a device for releasing the pressurized dry chemical fire extinguishant in the main fire extinguisher 12, and that various other devices or combinations of devices may be employed to activate one or more main fire extinguishers 12.

Upon activation, the dry chemical extinguishant in the main fire extinguisher 12 is released into a main discharge line 18 through which the extinguishant flows to a nozzle where the dry chemical is sprayed or otherwise delivered to the fire. Nozzles and methods for delivering dry chemical extinguishant to a fire are well known and, therefore, are not discussed in detail herein.

The present invention utilizes the release of the pressurized dry chemical fire extinguishant as the driving force for actuation of downstream slave devices. As discussed above, when a fire starts it may be preferable that a number of slave devices be actuated for a variety of reasons. For example, an alarm should be sounded for obvious reasons. Also, various doors, flues, dampers and the like can be controllably opened or closed to isolate the fire. Additionally, an extinguisher of the type employed in the fire suppression system of the present invention typically has a total discharge time of less than 25 seconds, and often less than 15 seconds. In such cases it is often desirable for successive or simultaneous actuation of additional extinguishers as slave devices.

In the present invention an actuator valve 20 is provided in communication with the main discharge line 18. In a preferred embodiment the actuator valve 20 is located within two feet, and more preferably within about one foot of the beginning of the main discharge line 18, in order to accelerate the response of the slave devices as explained below. As best shown in FIGS. 2 and 3 the valve 20 includes a piston 22 reciprocatable along the axis of the valve 20. The piston 22 has a head 24 and a base 26 integrally connected to one another. The piston head 24 is generally cylindrical, having a generally planar, round outside surface 28 and a generally planar, round inside surface 30. An outer peripheral wall 32 of the head 24 of the piston, to which the outside and inside surfaces 28 and 30 are axially aligned, rides along the inner cylindrical sidewall 34 of the valve 20 as the piston 22 reciprocates therein. The clearance between the sidewall 34 of the valve 20 and the outer peripheral wall 32 of the piston should be as tight as possible, typically less than about 0.005 inch. Additionally, a recess 36 should be provided in the outer peripheral wall 32 of the piston into which an "O" ring 37, such as a neoprene ring is provided to seal further the clearance area between the peripheral wall 32 and the sidewall 34 of the valve 20.

The piston 22 further includes a base portion 26 which is generally cylindrical in configuration. The diameter of the cylindrical base portion which is typically less than that of the piston head 24, is designed and positioned to reciprocate through a reduced area 38 of the valve 20. The length of the cylinder defining the base portion 26, must be sufficient to contact and move the check 40, as described below, when the piston 22 is in its lower-most position as illustrated in FIG. 3. To accomplish this result the configuration of the outside surface 42 of the base portion 26 is not limited, although a generally planar surface is desirable for simplicity.

In the actuator valve 20, opposite the piston 22, is a check 40 urged against a reduced area 38 of the valve 20 to close the valve 20 at such location. The outer surface 41 of the check 40 which may have a convex configuration is typically urged against the valve walls by a spring 44 mounted against a stationary, ring type seat 46. The spring 44 should have sufficient compressive strength to keep the valve 20 closed, yet be sufficiently resilient to compress and open the valve 20 when a force on the order of about ten (10) pounds per square inch, or greater, is applied thereagainst. The check 40 shown in the drawing includes a tip portion 48, generally cylindrical in configuration, extending into the reduced area 38 of the valve 20 in the direction of the base portion of the piston 26. The extended tip portion 48 provides a contact area where the outside surface 42 of the base portion 26 of the piston 22 may readily contact the check 40 as the piston 22 is moved toward the check 40.

Threaded to the actuator valve 20, in communication with the portion of the valve 20 housing the check 40, is a pressurized gas supply. Such gas supply may be easily provided by threading a gas cartridge 50 onto the base of the valve 20. Such cartridge 50 is preferably pressurized with nitrogen although other gases, including air may be used. The pressurized gas supply should be in direct communication with the valve 20 such that the gas will flow through the secondary discharge line 52 when the surface 41 of the check 40 is moved away from its seated position against the valve walls.

In operation, the main fire extinguisher 12 is actuated as described above, and the dry chemical extinguishant is delivered toward the fire through the main discharge line 18. The pressure increase in the main discharge line 18, as a result of the release of the dry chemical agent is considerable. Such pressure increase is exerted against the outside surface 28 of the piston 22 and causes the piston 22 to move toward the check 40. As the piston 22 moves, the outside surface 42 of the base 26 of the piston 22 contacts the tip 48 of the check 40. As shown in FIG. 2 the outside surface 42 of the base 26 of the piston 22 is in the raised position. Such raised position is maintained merely by the friction between the piston and the walls of the valve. Even if the piston lowered into contact with the check, the piston head 26 would merely rest against the tip of the check 40 until activation of the check as further described below.

The pressure in the main discharge line 18 is sufficient to further move the piston 22 to separate the surface 41 of the check 40 from its seat against the valve walls. As soon as this seal is broken, the pressurized gas supply, such as from the cartridge 50, escapes past the check 40 and through the secondary discharge line 52. The construction of the valve 20 results in an advantage. For example, it is typical that 1 psi would be required against the piston 22 to overcome each 14 psi of pressure urging the check into its closed position.

Upon release into the secondary discharge line 52, such pressurized gas supply is, in turn, utilized to actuate downstream slave fixtures as described in detail above.

In the present invention, a dry chemical fire extinguishant, which consists of solid particles suspended in a gas, can be used to actuate downstream slave devices. The prior art does not suggest that such a two phase mixture of a transfer gas and a solid could be successfully utilized for this purpose without clogging the lines and equipment. Yet in the present invention such gas-solid mixtures are successfully utilized to trigger another pure gaseous source which can be used to actuate slave devices in a fire extinguishing system.

For testing purposes the system of the present invention was actuated thirty-two (32) consecutive times. There was no cleaning of parts between tests. The system functioned each time, and was still considered to be operable and clean after the thirty-second test. Since such fire extinguishing systems are actuated, in service, on the average of less than five (5) times per year, such testing adequately demonstrationes the success of the system of the present invention.

Another advantage of this system is seen in the use of a cartridge 50 as the pressurized gas supply. Such cartridge 50 can be easily pressurized, without removal from the system, such as to 350 psig at 70° F., by delivering nitrogen into the valve through the secondary discharge line 52. Such gas delivery causes the piston 22 to move outwardly of the valve 20. For this reason a retaining ring 60 is preferably provided to keep the piston 22 within the valve 20 during repressurization of the cartridge 50. Simultaneously, such gas delivery overcomes the tension of the spring 44 moving the check 40 from its closed position and allowing such gas to flow into the cartridge 50. This procedure is called blowing past the check. A gage, as illustrated in phantom lines in FIGS. 2 and 3, is typically provided on the valve 20 to provide a ready visual means of determining and monitoring the required pressure within the cartridge 50.

Whereas the preferred embodiments of this invention have been described above for the purposes of illustration it will be apparent to those skilled in the art that various modifications of the details of this invention may be made without departing from the scope of this invention.

We claim:

1. An apparatus for pneumatically actuating slave devices in direct response to the discharge of a dry chemical fire extinguishant comprising:
   at least one main fire extinguisher containing pressurized dry chemical fire extinguishant,
   a main discharge pipe through which the pressurized dry chemical fire extinguishant from the main fire extinguisher passes,
   a cartridge containing a pressurized gas supply connected to said main discharge pipe through an actuator valve,
   said actuator valve comprising:
   a resilient check having a tip portion urged into intimate contact with the valve walls by the pressurized gas supply to prevent said pressurized gas from escaping the actuator valve,
   a piston reciprocally mounted in the actuator valve having a head disposed toward the main discharge pipe said head movable in response to pressure in the discharge pipe and fit into the actuator valve at sufficiently close tolerance to minimize gas transfer therethrough, said piston having a base portion facing the tip of the check and integrally connected with the head, such that depression of the piston head into the actuator valve releases the pressurized gas in the pressurized gas supply by forcing the tip of the check from its contact with the valve walls, and
   a secondary discharge pipe through which the pressurized gas in the pressurized gas supply is released when the pressure against the piston head is greater than the pressure against the resilient check,
   pneumatically responsive slave devices connected to the secondary discharge pipe, and
   means for releasing the pressurized dry chemical fire extinguishant in the main fire extinguisher into the main discharge line to create a force in the main discharge line greater than the force against the resilient check.

2. An apparatus as set forth in claim 1 wherein the dry chemical fire extinguishant in the main fire extinguisher is selected from the group consisting of sodium bicarbonate, monoammonium phosphate, and potassium bicarbonate.

3. An apparatus as set forth in claim 1 wherein the main fire extinguisher is pressurized to about 325–375 psig.

4. An apparatus as set forth in claim 1 wherein said cartridge is pressurized at about 325–375 psig.

5. An apparatus as set forth in claim 1 wherein the pressurized gas in the cartridge is selected from the group consisting of dry air and nitrogen.

* * * * *